April 11, 1950 — A. WYZENBEEK — 2,503,462

VARIABLE SPEED TRANSMISSION DEVICE

Filed May 31, 1946

Inventor:
Andrew Wyzenbeek.
By Dawson, Brittan & Spangenberg,
Attorneys.

Patented Apr. 11, 1950

2,503,462

UNITED STATES PATENT OFFICE 2,503,462

VARIABLE SPEED TRANSMISSION DEVICE

Andrew Wyzenbeek, Chicago, Ill.

Application May 31, 1946, Serial No. 673,348

5 Claims. (Cl. 74—55)

This invention relates to a variable speed transmission device and is particularly applicable to devices of the type employing expansible pulleys and belts engageable with the conical surface of the pulleys at different adjusted diameters to alter the transmission ratio.

In structures of the type employed for shifting pulleys to change the effective diameters thereof for altering the transmission ratio, it is common to employ pivoted structures which effect a movement of the pulley-bearing shaft but with a slight arcuate movement, the arcuate movement tending to tighten one pulley more than the other. Further, in the structures commonly employed and in order to provide sufficient bearing surface for supporting the pulley-bearing shaft, complicated and protruding structures are employed which take up considerable room and project into space which is needed. Further, such structures do not always provide the necessary rigid support for the member which slidably carries the pulley shaft.

An object of the present invention is to provide a structure in which a shaft bearing a pair of automatically adjustable pulleys is supported in such a manner as to shift the shaft in a substantially straight line without arcuate movement thereof. A further object is to provide such a structure in which thin plates provide a supporting base for the shaft, one of the plates being adapted for securing to a support structure while the other plate being slidably mounted thereon to carry the pulley shaft in a manner whereby substantially all of the area between the plates is effective as a stabilizing support for the pulley shaft. Yet another object is to provide a pulley supporting plate structure in which a flat cam member provides a stabilizing support between the plates as well as a means for accurately shifting the slidable shaft supported plate a desired distance. Yet another object is to provide a pulley shaft shifting structure in which thin plates are brought into frictional contact with one plate thereof turned to provide a cam chamber, together with a cam lying within said chamber and providing a stabilizing surface between said plates while being effective for the shifting of one of said plates relative to the other, the shifting plate carrying a shaft on which are mounted automatically adjustable pulleys. Other specific objects and advantages will appear as the specification proceeds.

Figure 1:
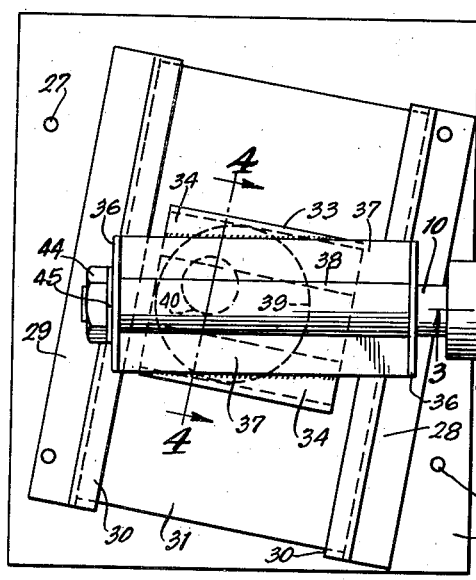
Figure 3:
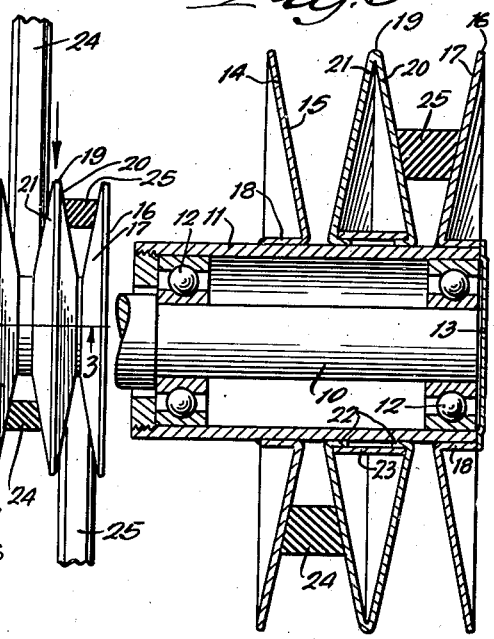
Figure 2:
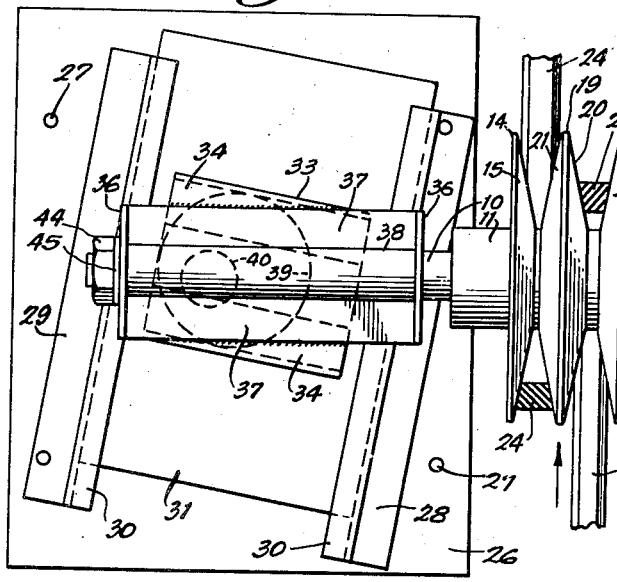

The invention is illustrated, in a preferred embodiment, by the accompanying drawing, in which:

Figure 1 is a broken plan view of apparatus embodying my invention; Fig. 2, a view similar to Fig. 1, but showing the pulley shaft advanced to a different position from that shown in Fig. 1; Fig. 3, an enlarged longitudinal sectional view of the shaft and pulley structure supported thereon; and, Fig. 4, a transverse sectional view on an enlarged scale, the section being taken as indicated at line 4 of Fig. 1.

In the illustration given, 10 designates a shaft which is illustrated as a fixed shaft. Upon the outer end of shaft 10 is mounted a hub or drum 11 which is supported upon the shaft 10 by ball bearings 12. It will be understood that any suitable anti-friction devices may be employed. A cap 13 may be employed at the end of the hub 11 to close the same.

Fixed upon the hub 11 is an inner pulley section 14 having an inner conical face 15. An outer pulley section 16 is fixed to the outer end of the hub 11 and is provided with an inner conical surface 17. Each of the members 14 and 16 have at their bottom hub flanges 18 which may be secured by spot welding or other means directly to the pulley hub 11.

An intermediate pulley section 19 is freely mounted upon the hub 11 between the sections 14 and 16. The section 19 is formed of a flat strip of metal folded so as to provide conical faces 20 and 21 and having its lower ends turned inwardly at 22. The inwardly turned ends 22 are joined by a ring 23 which may be welded to the ends 22.

The pulley sections 14, 16 and 19 provide a pair of pulleys adapted to receive a driving and a driven belt and the effective diameters of the two pulleys are changed to alter the transmission ratio of the two pulleys. The pulleys are indicated by the numerals 24 and 25.

In my improved structure for pivotally supporting the shaft 10, I provide a fixed plate 26 having openings 27 formed therein for fixing the plate to a wall or machine frame. The plate 26 is provided with a pair of parallelly extending guide strips 28 and 29, each of which is provided on its inner side with a shoulder 30 extending inwardly over the sliding plate 31. By means of the shoulders 30, which provide grooves between them and plate 26, the plate 31 is slidably supported firmly against the face of the fixed plate 26.

Figure 4:
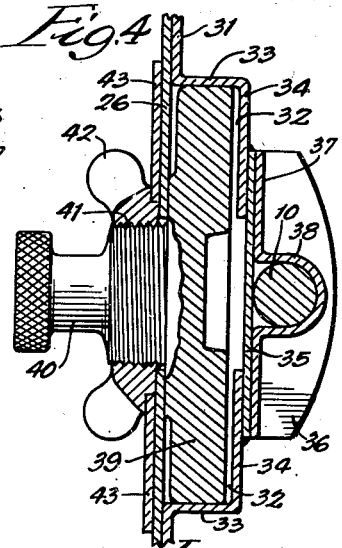

In order to maintain the firmness and stabilizing effect between the two plates, I provide a special cam structure which is received with a cam chamber of the sliding plate whereby effective movement of the sliding plate is accomplished while, at the same time, maintaining all of the supporting structures in firm contact with the result that no rocking movement or slight tilting movement of the pulley shaft can occur. To accomplish this result, I press the walls of the slidable plate 31 outwardly, as indicated in Fig. 4 to provide a cam chamber 32. In the structure thus provided, there are walls 33 extending at right angles to the plate 31 and walls 34 parallel to plate 31 but spaced outwardly therefrom. Welded to the outer face of walls 34 and angularly positioned thereon is a plate 35 having upwardly turned end portions 36. The shaft 10 extends through openings in the end walls 36 and is confined against plate 35 by means of a second plate 37 provided with a channeled central portion 38. Plate 37 may be secured to plate 35 by welding or any other suitable means.

Mounted within the cam chamber 32 is a cam 39 equipped with a central portion 40 extending through an aperture in the plate 26 and having a central threaded portion 41. A handle portion 42 is centrally apertured and threaded to engage the central threaded portion 41 and thus is locked thereby to the cam. In order to further buttress the plate structure, I provide a wide metal washer 43 which lies against plate 26 and has an inner portion extending under a shoulder provided by the handle member 42.

The inner end of shaft 10 may be threaded and secured by nut 44, a washer 45 being interposed between nut 44 and end wall 36.

Operation

In the operation of the device, the handle 42 may be rotated so as to swing the cam 39 into different positions. Two positions are illustrated in Figs. 1 and 2. Movement of the cam 39 brings the cam surface into engagement with the walls 33 of the sliding plate 31 and shifts sliding plate 31 along the oblique path in which it is guided. At the same time, the angularly positioned plate 35 carried by the raised portion 34 of plate 31 shifts the shaft 10 in the directions indicated by arrows in Figs. 1 and 2. The movement of the pulley hub 11 in the direction indicated by the arrows in Figs. 1 and 2 causes the inner freely slidable pulley section 19 to swing either to the right or the left, depending upon the direction of movement in which the pulley shaft is moved. Such lateral shifting of the pulley section 19 varies the effective diameter of the two pulleys so that the belts 24 and 25 assume the different positions illustrated in Figs. 1 and 2.

In the shifting operation, which has been described, there is no arcuate or swinging movement of the shaft which will tend to guide one pulley more than the other. Instead, the pulley shaft moves in a straight line and the wide bearing surfaces of the supporting plates prevent any other movement which would bring about an unsatisfactory relative tightening of the pulley belts. In the latter operation, the wide plates furnish the stabilizing support required while, at the same time, the flat cam, by reason of its contact between the plates, increases the stabilizing effect. Thus the wide cam not only serves as an accurate means for adjusting the relative position of the plates but also provides a flat anchorage or stabilizing support between the plates so that no misalignment or tilting of the pulley shaft 10 can occur.

While in the foregoing description, I have set forth one embodiment of the invention in considerable detail, it will be understood that such details may be varied widely by those skilled in the art without departing from the spirit of my invention.

I claim:

1. In a device of the character set forth equipped with a pulley shaft, a fixed plate, a second plate slidably mounted on said fixed plate and having its central portion struck outwardly to provide a cam chamber, means securing said shaft to said upwardly struck portion of said sliding plate, a cam rotatably mounted in said chamber, the cam member lying within said chamber and engaging said outwardly struck walls of said sliding plate, and means for rotating said cam to shift said sliding plate.

2. In a device of the character set forth equipped with a pulley shaft, a pair of sheet metal plates slidably connected, at least one of said plates carrying said shaft and providing a cam chamber, a cam rotatably mounted in said chamber and adapted to engage the shaft-bearing plate to move it, and handle means extending through one of said plates for rotating said cam.

3. In a device of a character set forth equipped with a shaft having fixed and movable pulley sections, a fixed plate, longitudinal members angularly secured to said plate and providing spaced grooves, a slidable plate having its edge portions received in said groove, said plate having its central portion struck outwardly to provide a cam chamber, means angularly securing said shaft to said upwardly struck portion of said sliding plate, a flat cam member within said chamber and adapted to engage the outwardly struck walls of said plate, and means for rotating said cam to shift to said sliding plate.

4. In an apparatus for moving a shaft equipped with fixed and movable pulley sections, a plate adapted to be fixed to a stationary surface, a second plate slidably secured to said first plate, said second plate providing centrally a cam chamber between it and said first plate, a flat cam member lying within said cam chamber and adapted upon rotation to engage said second plate to move it and a handle member engaging said cam and extending through said first plate, said shaft being fixed to said second plate above said cam chamber.

5. Apparatus for moving a shaft, comprising, a fixed plate, a second plate slidably mounted on said fixed plate for oblique movement with respect thereto, said second plate having a recess therein between it and said fixed plate providing a cam chamber, a flat cam rotatably mounted in said chamber and adapted to engage said second plate to slide it, means for rotating said cam, and a shaft plate carried by said second plate in angular relation thereto and having an end wall parallel with the adjacent edge of said fixed plate, said end wall being apertured to receive said shaft.

ANDREW WYZENBEEK.

REFERENCES CITED

The following references are of record in the file of this patent:

UNITED STATES PATENTS

| Number | Name | Date |
|---|---|---|
| 1,984,507 | Waner | Dec. 18, 1934 |
| 2,245,889 | Windle | June 17, 1941 |
| 2,273,478 | Thompson | Feb. 17, 1942 |